(12) United States Patent
Wagner

(10) Patent No.: US 6,719,369 B1
(45) Date of Patent: Apr. 13, 2004

(54) CHILD SEAT ARRANGEMENT ON A MOTOR VEHICLE SEAT

(75) Inventor: Bernhard Wagner, Garching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 10/088,745

(22) PCT Filed: Sep. 6, 2000

(86) PCT No.: PCT/EP00/08685
§ 371 (c)(1),
(2), (4) Date: Mar. 22, 2002

(87) PCT Pub. No.: WO01/23209
PCT Pub. Date: Apr. 5, 2001

(30) Foreign Application Priority Data

Sep. 25, 1999 (DE) .................... 199 46 056

(51) Int. Cl.$^7$ ................................ A47C 1/08
(52) U.S. Cl. ........... 297/250.1; 297/472; 297/216.16; 297/256.15
(58) Field of Search ............ 297/216.11, 216.16, 297/216.18, 253, 256.15, 250.1, 472, 471

(56) References Cited

U.S. PATENT DOCUMENTS

| | | | |
|---|---|---|---|
| 3,957,303 A | * | 5/1976 | Mauron |
| 5,286,058 A | * | 2/1994 | Wier |
| 5,286,085 A | * | 2/1994 | Minami |
| 5,468,044 A | * | 11/1995 | Conan |
| 5,468,045 A | | 11/1995 | Weber |
| 5,664,830 A | * | 9/1997 | Garcia et al. |
| 5,685,603 A | * | 11/1997 | Lane, Jr. |

FOREIGN PATENT DOCUMENTS

| | | |
|---|---|---|
| DE | 19850961 A1 | 6/1999 |
| DE | 19800072 A1 | 7/1999 |
| DE | 29903414 U1 | 8/1999 |
| EP | 0554807 A2 | 8/1993 |
| EP | 0689955 A1 | 1/1996 |
| EP | 0927659 A2 | 7/1999 |
| WO | 98/25789 | 6/1998 |

OTHER PUBLICATIONS

International Search Report.
German Office Action.

* cited by examiner

Primary Examiner—Laurie K. Cranmer
(74) Attorney, Agent, or Firm—Crowell & Moring LLP

(57) ABSTRACT

In an arrangement of a child seat on a motor vehicle seat according to the ISOFIX standard, in the case of a crash-associated deceleration, the child seat is displaced in a limited manner in the direction of travel (FR), so that the resultant movement of the child in said direction of travel (FR) is compensated within the seatbelt system of the child seat.

9 Claims, 1 Drawing Sheet

CHILD SEAT ARRANGEMENT ON A MOTOR VEHICLE SEAT

BACKGROUND AND SUMMARY OF THE INVENTION

The invention relates to an arrangement of a child seat on a vehicle seat and a method of fastening a child seat on a vehicle seat.

Up to now, child seats in vehicles have usually been fastened by means of the vehicle-side belt system or by means of additional belts mounted in the vehicle. In the future, there will be the so-called ISOFIX Standard which is established or will be established in various standards. The ISOFIX Standard requires a basically rigid connection to adapters on the vehicle seat by means of locking elements on the child seat. As a result of this direct connection, the child seat is decelerated with the vehicle without any time shift. The connection of a child seat to a vehicle seat according to the ISOFIX Standard is described, for example, in German Patent Document DE 299 03 414 U1.

However, it is a disadvantage of a connection according to the ISOFIX Standard that, in the event of a crash, the child will still experience a certain forward displacement in the driving direction as a result of the child seat's own belt system, while the child seat itself remains rigidly connected with the vehicle seat. This reduces the child's wedging in the vehicle seat. Particularly in the event of a rebound, there is the danger, in the case of a child seat with a lap belt and a catch tray, that the child may be "pulled out" of the child seat.

This danger is avoided or reduced by a child seat of the invention in that, in the event of a crash-caused deceleration of the vehicle, a limited displacement of at least the backrest of the child seat in the driving direction takes place in order to compensate the child's displacement within the child-seat-side belt system. As a result, the child is held in an unchanged tight contact with the child-seat-side belt system and the child seat. This results in a higher safety for the child, in addition to the advantages achieved by the ISOFIX connection.

Although from European Patent Document EP 0 927 659 A2, an arrangement of a child seat on a vehicle seat by way of an ISOFIX system is known. In the case of the known arrangement, a deformation element is provided between the vehicle seat and the child seat, by means of which deformation element, peak loads in the detent device and/or fastening device of the ISOFIX system are to be reduced. As a result of the relative movement of the child seat with respect to the vehicle seat caused during a deforming of the deformation element, force peaks are reduced as they occur in the event of the impact of unsecured cargo on the rear seats of the backrest of the vehicle seat.

In contrast, in the case of the present invention, devices are provided at the child seat which permit a relative movement (of the backrest) of the child seat with respect to the child-seat-side fastening device, in which case, however, the child-seat-side belt system remains rigidly connected with the fastening device in order to restrain the child as best as possible. In contrast, as a result of the deformation element according to European Patent Document EP 0 927 659 A2, the child-seat-side belt system participates in the same manner in the limited forward displacement caused by the deforming of the deformation element as the entire child seat, with the initially mentioned disadvantages mentioned concerning the prior art.

The invention is preferably implemented by a displacement of the entire child seat with respect to the vehicle seat. However, to achieve the advantages of the invention, it is sufficient to permit a displacement of the backrest alone.

The vehicle-side belt system is formed, for example, by a lap belt with a catch tray. The invention has a particularly advantageous effect with respect to such a system because the increased wedging of the child according to the invention limits the forward displacement and reliably prevents a "pulling-out" of the child during the rebound. By means of the invention, it is also possible to bring a child seat with a catch tray into a sleeping or comfort position in which the backrest of the child seat has a larger inclination angle with respect to the seat surface so that the distance between the backrest and the catch tray is enlarged. The displacement (of the backrest) of the child seat permitted according to the invention in the event of a crash ensures a still sufficient wedging of the child in the child seat also in the sleeping or comfort position.

In principle, the invention can also be used in the case of child seats with a child-seat-side multipoint belt system without a catch tray with a 5-point belt system. It also has an advantageous effect in the case of child seats whose multipoint belt system is displaced with the child seat in the event of a crash, because energy can additionally be reduced by the devices for displacing the backrest of the child seat, for example, an expandable slot or a shear bolt.

Possible embodiments of the invention are illustrated in the drawing and will be explained in detail in the following.

DETAILED DESCRIPTION OF THE DRAWINGS

Figure 1:
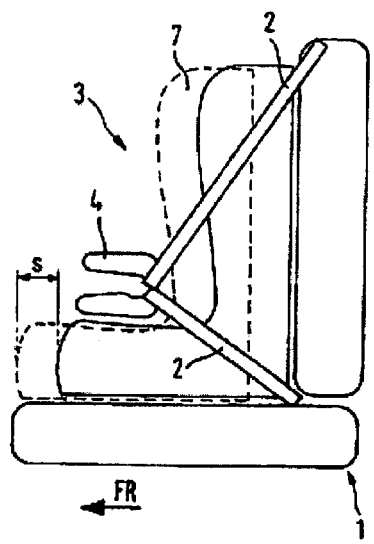
FIG. 1 is a lateral view of a known arrangement of a child seat on a vehicle seat by means of a vehicle-side belt system.

FIG. 1 illustrates a vehicle seat 1 on which a child seat 3 is fastened in a conventional manner by a vehicle-side or seat-side belt system 2, preferably a three-point arrangement. The child seat 3 as well as the child (not shown) are held by the belt system 2. In addition, a catch tray 4 is placed into the belt system. In the event of a crash-caused deceleration of the vehicle, a displacement of the child seat 3 in the driving direction FR takes place which is illustrated by the broken lines. Although this displacement by the distance s (because of the belt slack and the stretching of the belt strap of the belt system 2) impairs the course of the deceleration affecting the child, it maintains the child's wedging between the catch tray 4 and the "moving-up" backrest 7 of the child seat 3.

Figure 2:
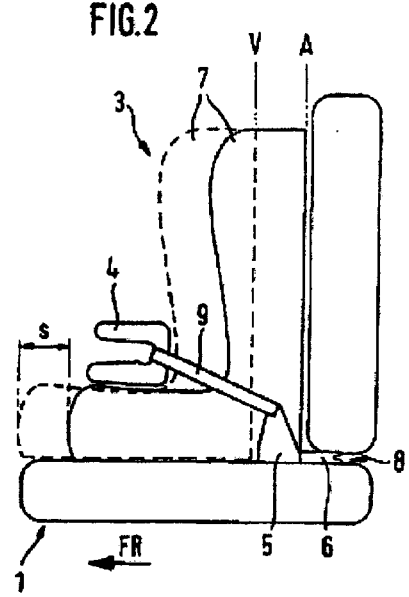
FIG. 2 is a view of an arrangement according to the invention corresponding to FIG. 1.

FIG. 2 illustrates an arrangement of a child seat 3 according to the invention by means of a fastening device corresponding to the ISOFIX Standard. On both sides of the child seat 3, the fastening device 5 has two elongated locking elements 6, the open end sections 8 of which engage with ISOFIX adapters on the vehicle seat 1 (not shown). The child is held on the child seat 3 by means of a child-seat-side belt system 9 with a catch tray 4.

As a result of the rigid ISOFIX connection, in the event of a vehicle crash, the backrest 7 of the child seat 3 remains in the initial position A with respect to the vehicle seat 1 which is illustrated by means of the solid lines. With respect to the above, caused by the crash, a certain forward displacement of the child in the driving direction FR takes place, although it is reduced with respect to the conventional systems according to FIG. 1. This forward-displacement reduces the wedging of the child in the child seat 3.

According to the invention, the fastening device 5 and the child seat 3 are constructed such that, in the event of a crash-caused deceleration of the vehicle, they permit a limited displacement of the child seat 3 in the driving direction FR by the distance s, whereby the child seat 3 takes up the position V. The fastening device 5 itself does not participate in the displacement so that the child-seat-side belt systems fastened to the fastening device 5 remains rigidly connected to the vehicle seat 1.

Figure 3:
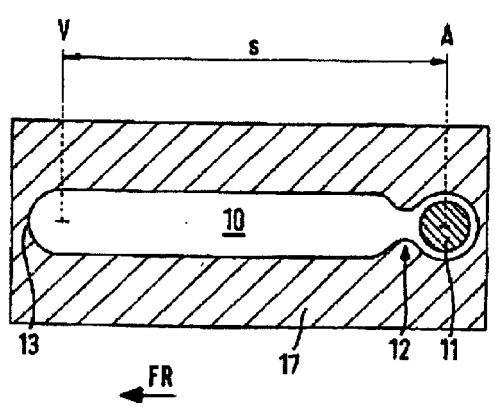
FIG. 3 and 4 are enlarged sectional views of details of the invention.

According to the embodiment of FIG. 3, a slot 10 extending in the driving direction FR is provided in a section 17 of the fastening device 5, in which slot 10 a child-seat-side bolt 11 engages. In the normal operation of the vehicle, the bolt 11 is held in the initial position A as illustrated in FIG. 3, because a narrowing 12 adjacent to the end of the slot 10 facing away from the driving direction prevents a displacement of the bolt 11 in the slot 10. When a defined limit value of the vehicle deceleration, as it is reached during a vehicle crash, is exceeded, because of the acting inertial forces of the child seat 3 and of the child secured thereby, the bolt 11 widens the narrowing 12 and moves along the slot 10 to the end-side stop 13.

As a result, the child seat 3 moves forward by the distance s, as is indicated by a broken line in FIG. 2, with the advantage of an increased wedging of the child in the child seat 3. The narrowing 12 is to be dimensioned such that the forces occurring in the normal driving operation do not cause a displacement of the bolt 11 in the slot 10.

Figure 4:
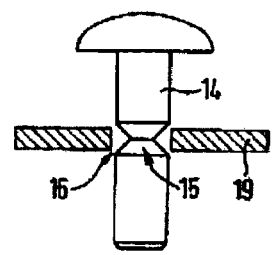

FIG. 4 illustrates another embodiment of the invention, which has a bolt 14 fixing the child seat 3 to a section 19 of the fastening device 5. The bolt 14 has a desired breaking point 15 which is arranged in the area of an opening 16 of the section 19. When a defined crash-caused vehicle deceleration is exceeded, the bolt 14 designed as a shear bolt is severed and thus releases the child seat 3 for a limited displacement in the driving direction FR. The bolt 14 is simultaneously held in another, not shown guide, so that the displacement in the driving direction FR is limited.

What is claimed is:

1. Arrangement of a child seat on a vehicle seat, the child seat having a vehicle-independent belt system for securing the child as well as having a fastening device for connecting the child seat to the vehicle seat,
   wherein the vehicle-independent belt system is fastened to the fastening device and wherein devices are provided on the child seat which, in the event of a crash-caused deceleration of the vehicle, permit a limited displacement at least of the backrest of the child seat in the driving direction with respect to the fastening device, while a rigid connection of the vehicle-independent belt system to the fastening device is unchanged.

2. Arrangement according to claim 1,
   wherein the devices which permit a limited displacement comprise a slot in the fastening device, which slot extends in the driving direction and into which a child-seat-side connection bolt engages, the slot having a narrowing adjacent to the initial position, which faces away from the driving direction, of the connection bolt, which narrowing can be widened by the connection bolt when a crash-caused deceleration acts upon the child seat.

3. Arrangement according to claim 1,
   wherein the devices which permit a limited displacement comprise a child-seat-side bolt which engages in the fastening device and has a desired breaking point which, in the event of a crash-caused deceleration of the child seat results in the breakage of the bolt.

4. An arrangement for fastening a child seat and a vehicle-independent child seat belt on a vehicle seat, comprising:

a fastening device for fastening the child seat and the vehicle-independent child seat belt to the vehicle seat; and a mechanism operatively associated with the fastening device, wherein the mechanism allows a limited displacement of at least the backrest of the child seat in the driving direction relative to the vehicle seat in the event of a crash-caused deceleration of the vehicle but maintains a rigid connection between the vehicle-independent child seat belt and the vehicle seat, while the mechanism allows a rigid connection between the child seat and the vehicle seat under the vehicle's normal operating conditions.

5. The arrangement according to claim 4,
   wherein the mechanism comprises a slot in the fastening device, which slot extends in the driving direction and into which a child-seat-side connection bolt engages, the slot having a narrowing adjacent to an end of the slot away from the driving direction, wherein the connection bolt is restricted by the narrowing to the end of the slot under the vehicle's normal operating conditions, but when a crash-caused deceleration acts upon the child seat, the connection bolt widens the narrowing and is displaced to the other end of the slot.

6. The arrangement according to claim 4,
   wherein the mechanism comprises a child-seat-side bolt which engages in the fastening device to rigidly fasten the child seat on the vehicle seat and has a desired breaking point, and wherein in the event of a crash-caused deceleration of the child seat, the bolt is broken to allow a limited displacement of at least of the backrest of the child seat in the driving direction.

7. A method of fastening a child seat and a vehicle-independent child seat belt on a vehicle seat, comprising:
   rigidly connecting the child seat and the vehicle-independent child seat belt to the vehicle seat under the vehicle's normal operating conditions using a fastening device; and
   allowing a limited displacement of at least the backrest of the child seat in the driving direction relative to the vehicle seat in the event of a crash-caused deceleration of the vehicle while the vehicle-independent child seat belt remains rigidly connected to the vehicle seat.

8. The method according to claim 7,
   wherein the rigidly connecting the child seat to the vehicle seat includes restricting a child-seat-side connection bolt to an end of a slot in a fastening device using a narrowing in the slot, the slot extending in the driving direction and the fastening device connecting the child seat to the vehicle seat, and wherein the allowing a limited displacement of at least of the backrest of the child seat relative to the vehicle seat includes allowing the connection bolt to widen the narrowing and to be displaced to the other end of the slot.

9. The method according to claim 7,
   wherein the rigidly connecting the child seat to the vehicle seat includes rigidly engaging a child-seat-side bolt with a fastening device for fastening the child seat to the vehicle seat, the child-seat-side bolt having a desired breaking point, and wherein the allowing the limited displacement of at least of the backrest of the child seat includes breaking the child-seat-side bolt to allow a limited displacement of at least of the backrest of the child seat.

* * * * *